March 19, 1957 H. GASTROW 2,785,439
DIE-CASTING MACHINE
Filed Aug. 20, 1952 2 Sheets-Sheet 2
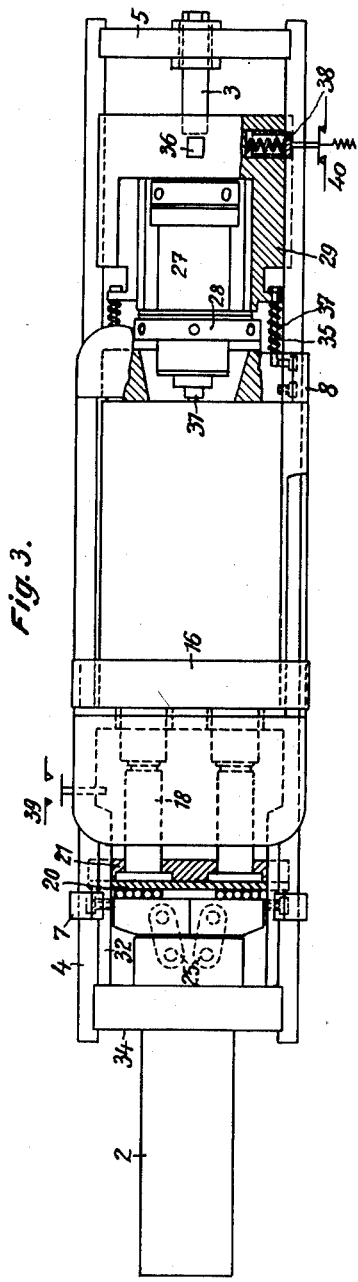
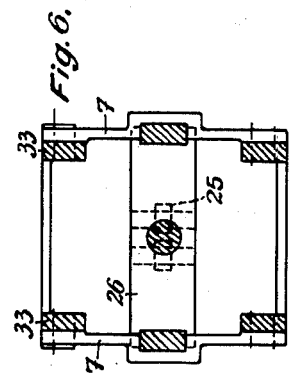
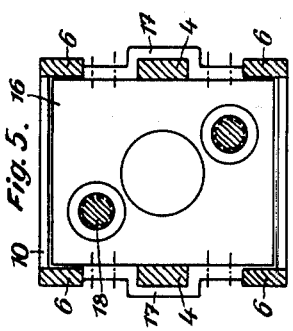
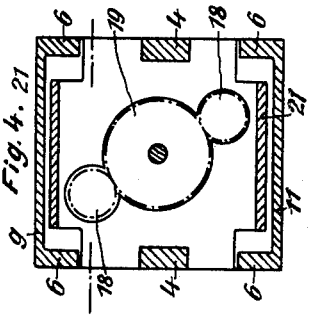
INVENTOR.
Hans GASTROW
BY

United States Patent Office 2,785,439
Patented Mar. 19, 1957

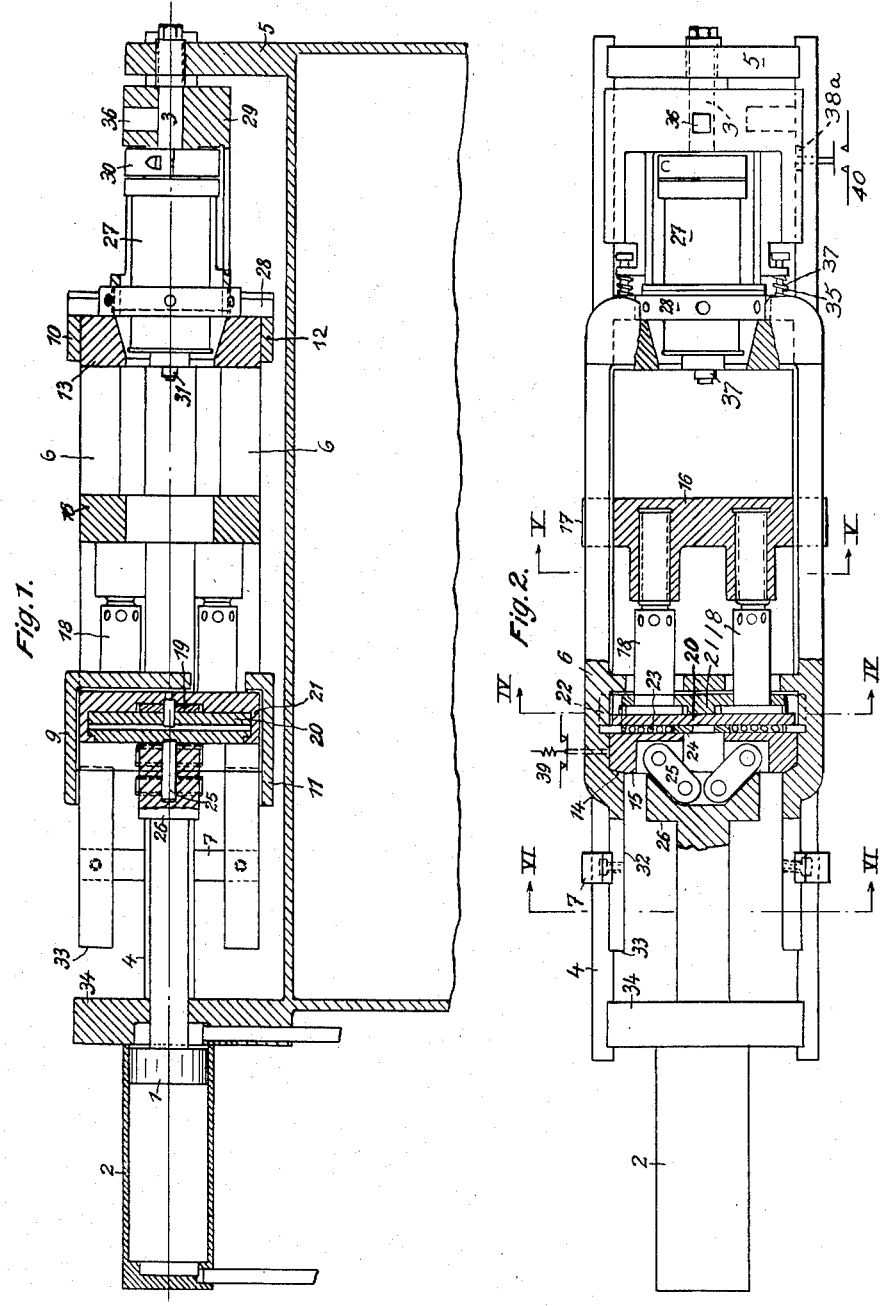

2,785,439

DIE-CASTING MACHINE

Hans Gastrow, Berlin-Lichterfelde, Germany

Application August 20, 1952, Serial No. 305,326

Claims priority, application Germany August 24, 1951

12 Claims. (Cl. 18—30)

This invention relates to machines for forming articles, and more particularly to die-casting machines for the manufacture of articles from thermoplastic materials and metals.

An object of the invention is to provide a die-casting machine wherein the formation of burrs on the die-castings under the pressure of the mass injected into the cavity of the mold is avoided.

Another object of the invention is to provide a die-casting machine which may be readily manipulated.

A further object of the invention is to improve on the construction of die-casting machines as now customarily made.

Other objects and structural details of the invention will be apparent from the following description when read in conjunction with the accompanying drawings forming part of this specification, wherein:

Fig. 1 is a longitudinal sectional view of a die-casting machine according to the invention, the mold being closed and the piston being in the injection end position;

Fig. 2 is a longitudinal section through Fig. 1;

Fig. 3 is a top plan view of the die-casting machine, some parts being shown in section, the elements of the machine being shown in the same position as in Fig. 1, the opened mold support being shown with the working piston in retracted position; the mold itself is not illustrated;

Fig. 4 is a section taken along the line IV—IV of Fig. 2;

Fig. 5 is a section taken along the line V—V of Fig. 2;

Fig. 6 is a section taken along the line VI—VI of Fig. 2.

For the sake of better illustration all elements of the machine unnecessary for the understanding of the invention and the operation of the machine, such as screw connections, packings and so on, are omitted, irrespective of the possibility of manufacturing or assembling the parts as shown.

Referring now to the drawings, the hydraulic driving piston 1 is reciprocated in the cylinder 2 in the closing or opening direction of the mold by a suitable control of fluid pressure selectively conveyed to one or the other side of said driving piston. The working cylinder 2 and the injecting piston 3 rigidly connected with each other by tie rods or guiding rods 4 are in turn rigidly connected with the bed 5 of the machine so as to form a unit.

The forces for closing the mold are absorbed in a unitary frame consisting of four bars 6, said frame being slidably arranged on the guiding rods 4. For this purpose the upper half and the lower half of said frame are connected with each other by bars 7 and 8 screwed thereto, said bars 7 and 8, on the one hand, holding said two halves together and, on the other hand, assuring a perfect guiding of the frame on the guiding rods 4. The pair of upper frame bars 6 and the pair of lower frame bars 6 are connected with each other by bridges 9, 10 and 11, 12 respectively absorbing forces acting perpendicular to the frame bars. Preferably, said bridges are cast as a unit together with the pair of associated frame bars or they are welded to said associated frame bars. The mold support 13 arranged at the side of the nozzle 31 is rigidly connected with said frame 6 in a suitable manner so as to form a unit with the latter. Four inclined abutting surfaces 14 are arranged at the other end of the four frame bars 6 absorbing the forces closing the mold. Upon completion of the closing movement of the movable mold support 16 two locking wedges abut against said abutting surfaces 14. The movable mold support 16 is guided on the guiding rods 4 by bars 17 screwed to said movable mold support 16; the slidable arrangement of the movable mold support 16 on the guiding rods 4 is similar to the slidable arrangement of the frame 6 on said guiding rods 4. The distance of the movable mold support 16 from the mold support 13 may be adjusted by four spindles 18 in conformity with the desired height of the mold. All four spindles 18 may be simultaneously adjusted by means of a pinion 19 arranged in the center between said spindles and in mesh with gears connected to the latter. The plane sides of the gears connected with the spindles 18 are in abutting engagement with a plate 20 rigidly connected with a guiding slide 21 by screws. Lugs 22 secured to the guiding slide 21 are slidably engaged with the guiding rods 4. Two wedge-slides 15 are slidably engaged with dove-tail guides of the guiding slide 21 for movement in a direction perpendicular to the direction of movement of the mold. Said wedge-slides 15 abut against said plate 20 through the medium of rollers 23 guided by cages 24. Both wedge-slides 15 are connected by links 25, journalled in roller bearings, with the head 26 of the piston rod. The roller bearings associated with the wedge-slides 15 and the links 25 are essential features for a sufficient bracing of the halves of the mold. If such roller bearings were omitted, it would be impossible to obtain bracing forces of 100 or more tons, as required, by means of the force required for the piston pressure, as the frictional forces would become too high.

On the one hand, the force of the piston 1 acting through the medium of the wedge-slides 15 holds the halves of the mold tightly together, bracing same, and, on the other hand, said force through the intervention of frame 6 also presses the mass softened in the heating cylinder 27 into the cavity of the mold. In order to obtain these effects, during an advance of the frame 6 the mold support 13 arranged at the side of the nozzle 31 and rigidly connected with the frame 6 abuts against the threaded ring 28 adjustably mounted on the support or carriage 29 of the heating cylinder 27, likewise slidably engaged with the guiding rods 4, and, when the pressing is continued, said mold support 13 pushes the heating cylinder 27 onto the stationary piston 3 whereby the mass is pressed into the cavity of the mold. The heating cylinder 27 is connected with its support or carriage 29 by a split ring 30.

Thus, the forces for bracing the mold are the higher, the more pressure is exerted on the injecting piston 3. The adjustable threaded ring 28 permits an adjustment of the position of the nozzle 31 of the heating cylinder 27 relative to the mold.

When the piston 1 performs an opening stroke, at first the mold is unlocked by means of the links 25. During the continuation of the opening stroke, the locking slides 15 slide along the guiding surfaces 32 of the frame 6. Upon completion of the mold opening stroke the guides 22 of the slide 21 abut against the guiding bars 7 of the frame whereupon they move the latter in opening direction until the ends 33 of the frame abut against the bracket 34 carrying the hydraulic cylinder 2. Now, when the head 26 of the piston rod also abuts against the bracket 34, the opening end position is obtained.

The mold support 13 arranged at the side of the nozzle 31 is connected by pins 35 with the support 29 of the heating cylinder 27 for interrelated movements in such a manner that during the return movement of the frame 6, when the latter and the mold support 13 attached thereto have been displaced through a distance corresponding to the desired distance between the nozzle and the mold, the support 29 of the heating cylinder is pulled off from the piston 3. Thus, the support of the heating cylinder is brought into such a position relative to the piston that fresh material for the next die-casting process may be supplied to the heating cylinder through the inlet 36. Springs 37 assist in the relative movement between nozzle and mold during the opening movement. Now, the hydraulic drive acting on the piston 1 in the direction of return may be stopped, or the delivery output of the hydraulic driving pump must be automatically reduced to zero as soon as a predetermined maximum pressure has been reached.

It is also possible to use for the return relative movement between heating cylinder and piston a separate cylinder and piston; in such a case the connecting pins 35 become superfluous.

When the support 29 of the heating cylinder 27 is in its retracted position a locking member arranged on the support 29 of the heating cylinder comes into locking engagement with a notch 38 or the like of a guiding rod 4. The notch 38 has such an inclination in the direction of closing movement that it causes an automatic release of the locking device when a force of predetermined degree, for example of about 200 kg. (kilograms) acts on the support 29 of the heating cylinder. Thus, damages to the mold may be avoided. If, for example, during the ejection of a die-casting a residue of the mass sticks to the mold, there is the danger of pressing said residue into the surfaces of the mold under the high pressure acting on the halves of the mold, thus causing damage to the mold. Owing to the described operation of the machine in combination with the notch 38 and two contacts 39 and 40 the mold will not be closed with its full bracing force when residues are present between the mold plates; in such a case, the machine is automatically reversed for opening movement as soon as a pressure acts on the halves of the mold corresponding to the force causing a release of the locking device, whereupon the mold remains in open position until the residues are removed and the machine is re-started. This protection is obtained in the following manner: One of the wedge slides 15 closes the contact 39 shortly before it reaches its end locking position during a movement perpendicular to the closing movement of the working piston 1. A second contact 40 is opened, as soon as the locking device is released at the notch 38. Now, if the mold is closed while residues are between the mold plates, the wedge-slides 15 move the frame 6 in closing direction already before they reach their end position. Thus, while the contact 39 is still open, the frame causes a disengagement of the spring-loaded locking member from the notch 38 through the screw connection 28 and support 29 of the heating cylinder 27 whereby the contact 40 is also opened. If both contacts 39 and 40 are opened, the machine is automatically reversed for opening movement whereupon, after completion of the opening stroke the machine is arrested with the mold in open condition. Thus, damage to the mold plates by a pressing in of residues of the mass is rendered impossible.

The contact 40 is also opened during the closing of the mold when there are no residues between the mold plates. However, in such a case the contact 39 is closed beforehand, as the wedge-slides are already in their end position. Thus, when the contacts 39 and 40 are connected with each other in parallel, at all times one of said two contacts will maintain the condition of connections causing a closing of the mold, when the spindles 18 are properly adjusted.

The arrangement according to the invention also protects the machine from an incorrect adjustment of the spindles 18. If the spindles are set for too short a length, merely a formation of burrs on the die-castings will occur, as a bracing of the mold does not take place. If the spindles are set for too great a length, a destruction of the abutting surfaces may occur as the latter are not brought entirely into abutting engagement. According to the invention, however, the halves of the mold cannot be brought into closing position with full locking force when the spindles are set for too great a length, as prior to the closing the machine is already switched off by the contact 40, while the contact 39 is not yet closed. Thus, in such a case, the machine is switched for movement in opening direction and is arrested with open mold.

The same effect may also be obtained without a notch arrangement by making the opening of the contact 40 dependent on the relative movement between the support 29 of the heating cylinder 27 and the mold support 13. This movement starts only after the pre-load of the springs 37 has been overcome. In this case, the pre-load of the springs 37 is a measure for the pressure between the mold plates, at which pressure the machine is switched for movement in opening direction, when residues are caught between the mold plates or the spindles are set for too great a length.

I have described preferred embodiments of my invention, but it is understood that this disclosure is for the purpose of illustration and that various omissions or changes in shape, proportion and arrangement of parts, as well as the substitution of equivalent elements for those herein shown and described may be made without departing from the spirit and scope of the invention as set forth in the appended claims.

What I claim is:

1. A die-casting machine comprising in combination: a bed, a fluid pressure drive including a cylinder and a working piston reciprocable therein, an injecting piston, a plurality of guiding rods rigidly connecting the cylinder of said drive with said injecting piston so as to form a unit, said unit being rigidly connected with said bed, a frame slidably engaged with said guiding rods, an injection cylinder arranged for cooperation with said injection piston and movable relative thereto in response to the movement of said frame toward said piston to bring about an injection operation, a first mold supporting member slidably engaged with said guiding rods, a second mold supporting member secured to said frame, said first and second mold supporting members being normally spaced from each other and being arranged for carrying a mold composed of a plurality of separable parts, actuating means interposed between said working piston and said first mold supporting member, and abutting means on said frame, said working piston being arranged for displacing said first mold supporting means towards said second mold supporting member through the medium of said actuating means so as to close the multi-part mold carried by same, said actuating means being in abutting engagement with said abutting means upon completion of the closing stroke of said first mold supporting member whereby the forces holding the parts of the mold in closed condition are absorbed by said frame, and said working piston being arranged for displacing the mold upon the closing thereof towards said injecting piston by a continuation of the movement of the first mold supporting member in the direction of the preceding movement for closing the mold to thereby cause said frame to move said injection cylinder relative to said injection piston.

2. In a die-casting machine as claimed in claim 1, said injection cylinder being heatable for heating material to be cast in the mold, and a carriage supporting said heatable cylinder, said carriage being slidable on said guiding rods, and said second mold supporting member being arranged for cooperation with said carriage.

3. In a die-casting machine as claimed in claim 1, said injection cylinder being heatable for heating material to be cast in the mold, a carriage supporting said heatable cylinder, said carriage being slidable on said guiding rods, and means having play in the direction of the opening movement of the working piston operatively connecting said second mold supporting member with said carriage whereby the latter is moved by the former in opening direction only after a predetermined relative movement between said second mold supporting member and said carriage.

4. In a die-casting machine as claimed in claim 1, said injection cylinder being heatable for heating material to be cast in the mold, a carriage supporting said heatable cylinder, said carriage being slidable on said guiding rods, and resilient means arranged between said second mold supporting member and said carriage.

5. In a die-casting machine as claimed in claim 1, said injection cylinder being heatable for heating material to be cast in the mold, a carriage supporting said heatable cylinder, said carriage being slidable on said guiding rods, said second mold supporting member being arranged for cooperation with said carriage so as to shift same and the heating cylinder towards said injecting piston when the movement of the working piston is continued in closing direction after the closing of the mold, and a second fluid pressure device operatively connected with said carriage for returning same into its stationary position.

6. A die-casting machine comprising in combination: a bed, a fluid pressure drive including a cylinder and a working piston reciprocable therein, an injecting piston, a heatable injection cylinder arranged for cooperation with said injection piston and movable relative thereto to bring about an injection operation, a plurality of guiding rods rigidly connecting the cylinder of said drive with said injecting piston so as to form a unit, said unit being rigidly connected with said bed, a first mold supporting member slidably engaged with said guiding rods, a second mold supporting member in slidable connection with said guiding rods, said first and second mold supporting members being normally spaced from each other and being arranged for carrying a mold composed of a plurality of separable parts, a slide member slidably supported by said guiding rods, a plurality of spindles adjustably mounted on said slide member, setting means on said slide member operatively engaged with said spindles for adjusting same, said first mold supporting means being engaged by said adjustable spindles, actuating means interposed between said working piston and said slide member, said working piston being arranged for displacing said first mold supporting member towards said second mold supporting member through the medium of said actuating means so as to close the multi-part mold carried by same, movable power transmission means connected to said second mold supporting member and operable by said working piston to move said injection cylinder relative to said injection piston for bringing about an injection stroke, wedge-shaped abutting means slidably engaged with said guiding rods, said actuating means including a plurality of wedge-slides supported by said slide member and movable in a direction perpendicular to the direction of movement of said slide member for interlocking engagement with said power transmission means, said wedge-slides being in operative engagement with said slide-member for displacing same, a piston rod connected with said working piston, and a number of links equal to the number of wedge-slides, each of said links being pivoted to the associated wedge-slide and to said piston rod, said wedge-slides being spread apart from each other after the mold-closing movement for engagement with said wedge-shaped abutting means.

7. A die-casting machine comprising in combination: a bed, a fluid pressure drive including a cylinder and a working piston reciprocable therein, an injecting piston, a heatable injection cylinder arranged for cooperation with said injection piston and movable relative thereto to bring about an injection operation, a plurality of guiding rods rigidly connecting the cylinder of said drive with said injecting piston so as to form a unit, said unit being rigidly connected with said bed, a first mold supporting member slidably engaged with said guiding rods, a second mold supporting member in slidable connection with said guiding rods, said first and second mold supporting members being normally spaced from each other and being arranged for carrying a mold composed of a plurality of separable parts, a slide member slidably supported by said guiding rods, a plurality of spindles adjustably mounted on said slide member, setting means on said slide member operatively engaged with said spindles for adjusting same, said first mold supporting means being engaged by said adjustable spindles, actuating means interposed between said working piston and said slide member, said working piston being arranged for displacing said first mold supporting member towards said second mold supporting member through the medium of said actuating means so as to close the multi-part mold carried by same, movable power transmission means connected to said second mold supporting member and operable by said working piston to move said injection cylinder relative to said injection piston for bringing about an injection stroke, wedge-shaped abutting means slidably engaged with said guiding rods, said actuating means including a plurality of wedge-slides movably arranged in said slide member in a direction perpendicular to the direction of movement of said slide member, anti-friction bearings interposed between said wedge-slides and said spindles so as to cause an operative connection between said wedge-slides and said slide member carrying the spindles for a displacement of said slide member by said wedge-slides, a number of links equal to the number of wedge-slides, each of said links being pivoted to the associated wedge-slide and to said piston rod, and additional anti-friction bearings associated with the pivotal connections of said links, said wedge-slides being spread apart from each other after the mold-closing movement for engagement with said wedge-shaped abutting means.

8. A die-casting machine comprising in combination: a bed, a fluid pressure drive including a cylinder and a working piston reciprocable therein, an injecting piston, a heatable injection cylinder arranged for cooperation with said injection piston and movable relative thereto to bring about an injection operation, a plurality of guiding rods rigidly connecting the cylinder of said drive with said injecting piston so as to form a unit, said unit being rigidly connected with said bed, a first mold supporting member slidably engaged with said guiding rods, a second mold supporting member in slidable connection with said guiding rods, said first and second mold supporting members being normally spaced from each other and being arranged for carrying a mold composed of a plurality of separable parts, a slide member slidably supported by said guiding rods, a plurality of spindles adjustably mounted on said slide member, setting means on said slide member operatively engaged with said spindles for adjusting same, said first mold supporting means being engaged by said adjustable spindles, actuating means interposed between said working piston and said slide member, said working piston being arranged for displacing said first mold supporting member towards said second mold supporting member through the medium of said actuating means so as to close the mutli-part mold carried by same, movable power transmission means connected to said second mold supporting member and operable by said working piston to move said injection cylinder relative to said injection piston for bringing about an injection stroke, a frame slidably engaged with said guiding rods, said second mold supporting member being secured to said frame, guiding means on said frame, wedge-shaped abutting means on said frame, said actuating means including a plurality of wedge-slides movably arranged in said slide member in a direction perpendicular to the direction of movement of said slide member, said wedge-slides being in operative engagement with said slide member for displacing same, a piston rod connected with said working piston, and a number of links equal to the number of wedge-slides, each of said links being pivoted to the associated wedge-slide and to said piston rod, said wedge-slides being in slidable engagement with said guiding means of the frame during the mold-closing movement of the working piston, and said wedge-slides being spread apart from each other after the mold-closing movement for engagement with said wedge-shaped abutting means.

9. A die-casting machine comprising in combination: a bed, a fluid pressure drive including a cylinder and a working piston reciprocable therein, an injecting piston, a heatable injection cylinder arranged for cooperation with said injection piston and movable relative thereto to bring about an injection operation, a plurality of guiding rods rigidly connecting the cylinder of said drive with said injecting piston so as to form a unit, said unit being rigidly connected with said bed, a first mold supporting member slidably engaged with said guiding rods, a second mold supporting member in slidable connection with said guiding rods, said first and second mold supporting members being normally spaced from each other and being arranged for carrying a mold composed of a plurality of separable parts, a slide member slidably supported by said guiding rods, a plurality of spindles adjustably mounted on said slide member, setting means on said slide member operatively engaged with said spindles for adjusting same, said first mold supporting means being engaged by said adjustable spindles, actuating means interposed between said working piston and said slide member, said working piston being arranged for displacing said first mold supporting member towards said second mold supporting member through the medium of said actuating means so as to close the multi-part mold carried by same, movable power transmission means connected to said second mold supporting member and operable by said working piston to move said injection cylinder relative to said injection piston for bringing about an injection stroke, wedge-shaped abutting means slidably engaged with said guiding rods, said actuating means including a plurality of wedge-slides movably arranged in said slide member in a direction perpendicular to the direction of movement of said slide member, said wedge-slides being in operative engagement with said slide member for displacing same, a piston rod connected with said working piston, a number of links equal to the number of wedge-slides, each of said links being pivoted to the associated wedge-slide and to said piston rod, a heating cylinder for heating material to be cast in the mold, a carriage supporting said heating cylinder, said carriage being slidable on said guiding rods, and said second mold supporting member being arranged for cooperation with said carriage, a first electric contact associated with one of said wedge-slides, said first contact being closed by said wedge-slide when the latter reaches its outer end position during a movement perpendicular to the movement of the slide member, and controlling means operatively engaged with said carriage and said second contact, said controlling means being automatically actuated by said carriage in dependence on an approaching movement of predetermined degree by the second mold supporting member towards said carriage so as to open said second contact, and said first and second contacts being electrically connected with each other for switching the machine for opening movement of the working piston when both contacts are open and for stopping the machine thereafter with the mold in open condition.

10. In a die-casting machine as claimed in claim 9, one of said guiding rods having a notch, and said controlling means including a spring-loaded locking member movably arranged on said carriage for cooperation with said notch.

11. In an injection molding machine for making articles of thermoplastic material or metal, which has a first and a second mold supporting member movable relative to each other by fluid operable actuating means, the combination of: a bed, a movable frame movably supported by said bed and connected to said first mold supporting member so as to cause the latter to move with said frame in the longitudinal direction thereof, link means, a movable actuating member forming part of said fluid operable actuating means and pivotally connected to said link means for actuating the same, locking means pivotally connected to said link means and movable in a direction parallel to the longitudinal direction of said movable frame and also movable transverse thereto for establishing interlocking engagement between said frame and said locking means, said locking means being provided with a tapered surface, anti-friction bearing means interposed between said locking means and said second mold supporting member and arranged to convey pressure from said movable actuating member to said mold supporting member while allowing said locking means to move in a direction substantially transverse to the longitudinal movement of said movable frame for establishing interlocking engagement with the latter, said movable frame being provided with a tapered surface for engagement with the tapered surface of said locking means, slide means movably supported by said bed for urging said actuating means to close the first and second mold supporting members prior to said interlocking between said frame and said locking means and a heatable injection cylinder-piston assembly having a stationary member and a movable member and including a nozzle, said frame being operable to move said movable member relative to said stationary member to thereby cause heated material in said injection cylinder-piston assembly to pass through said nozzle.

12. In an injection molding machine for making articles of thermoplastic material or metal, which has a first and a second mold supporting member movable relative to each other by fluid operable actuating means, the combination of: a bed, a movable frame movably supported by said bed and connected to said first mold supporting member so as to cause the latter to move with said frame in the longitudinal direction thereof, said movable frame being provided with a tapered surface, a movable actuating member forming part of said fluid operable actuating means, slide means movably supported by said bed and operatively connected to said second mold supporting member for conveying pressure thereto from said fluid operable actuating means, link means having one end pivotally connected to said movable actuating member, locking means pivotally connected to the other end of said link means and movable in a direction parallel to and also transverse to the longitudinal direction of said frame for establishing interlocking engagement between said locking means and said frame, said locking means being provided with a tapered surface, anti-friction bearing means interposed between said locking means and said mold supporting means and carried by said slide means for facilitating said transverse movement of said link means, and a heatable injection cylinder-piston assembly having a stationary piston and a movable cylinder and including a nozzle, said locking means being arranged to convey closing pressure to said mold supporting means and subsequently to lock said frame to said locking means by engagement between the tapered surfaces of said frame and said locking means to thereby convey actuating pressure from said movable actuating member to said movable frame for moving said injection cylinder relative to said injection piston to bring about an injection operation.

(References on following page)

References Cited in the file of this patent

UNITED STATES PATENTS

| | | |
|---|---|---|
| 1,662,750 | Kaufmann | Mar. 13, 1928 |
| 1,910,284 | Fiegel et al. | May 23, 1933 |
| 1,916,495 | Shaw | July 4, 1933 |
| 2,120,333 | Kubo | June 14, 1938 |
| 2,298,043 | Dinzl | Oct. 6, 1942 |
| 2,492,259 | Beuscher | Dec. 27, 1949 |
| 2,577,412 | Ferrell | Dec. 4, 1951 |
| 2,618,823 | Perkon | Nov. 25, 1952 |
| 2,680,883 | Ashbaugh | June 15, 1954 |

FOREIGN PATENTS

| | | |
|---|---|---|
| 637,307 | Great Britain | May 17, 1950 |